United States Patent [19]

Sheth

[11] Patent Number: 4,777,073
[45] Date of Patent: Oct. 11, 1988

[54] BREATHABLE FILMS PREPARED FROM MELT EMBOSSED POLYOLEFIN/FILLER PRECURSOR FILMS

[75] Inventor: Paresh J. Sheth, Sugarland, Tex.

[73] Assignee: Exxon Chemical Patents Inc., Linden, N.J.

[21] Appl. No.: 24,503

[22] Filed: Mar. 11, 1987

[51] Int. Cl.$^4$ .................. B32B 3/12; B32B 5/22; B29D 7/24; D02J 1/06
[52] U.S. Cl. .................. 428/155; 428/159; 428/317.9; 428/409; 428/910; 264/288.4; 264/288.8
[58] Field of Search .......... 264/288.8, 288.4; 428/155, 159, 409, 317.9, 910

[56] References Cited

U.S. PATENT DOCUMENTS

| | | | |
|---|---|---|---|
| Re. 28,606 | 11/1975 | Ikeda et al. | 428/155 |
| 3,426,754 | 2/1969 | Bierenbaum | 264/288.8 |
| 3,642,967 | 2/1972 | Doll | 264/288.8 |
| 3,832,267 | 8/1974 | Chia-Seng Liu | 264/288.8 |
| 3,903,234 | 9/1975 | Ikeda et al. | 264/288.8 |
| 4,116,892 | 9/1978 | Schwarz | 521/62 |
| 4,134,951 | 1/1979 | Dow et al. | 264/147 |
| 4,135,023 | 1/1979 | Lloyd et al. | 428/167 |
| 4,298,647 | 11/1981 | Cancio et al. | 428/167 |
| 4,303,714 | 12/1981 | Mercer | 428/135 |
| 4,350,655 | 9/1982 | Hoge | 264/145 |
| 4,380,564 | 4/1983 | Cancio et al. | 428/167 |
| 4,465,729 | 8/1984 | Cancio et al. | 428/167 |
| 4,472,328 | 9/1984 | Sugimoto et al. | 264/41 |
| 4,585,604 | 4/1986 | Okuyama et al. | 264/41 |
| 4,626,252 | 12/1986 | Nishizawa et al. | 604/370 |

FOREIGN PATENT DOCUMENTS

| | | | |
|---|---|---|---|
| 0229731 | 10/1985 | Japan | 264/288.8 |
| 0257221 | 12/1985 | Japan | 264/288.8 |
| 1235439 | 10/1986 | Japan | 264/288.8 |
| 1264031 | 11/1986 | Japan | 264/288.8 |

OTHER PUBLICATIONS

Parameters Affecting Processing of Polymers and Polymer Blends, Skoroszewski, Plastics & Polymers, Jun. 1972, pp. 142–152.

Primary Examiner—John E. Kittle
Assistant Examiner—P. J. Ryan
Attorney, Agent, or Firm—Charles E. Smith; John F. Hunt

[57] ABSTRACT

A breathable polyolefin film is prepared by melt embossing a highly filled polyolefin film to impose a pattern of different film thickness therein and by stretching the melt embossed film to impart greater permeability in the areas of reduced thickness in comparison to the areas of greater thickness.

29 Claims, No Drawings

4,777,073

BREATHABLE FILMS PREPARED FROM MELT EMBOSSED POLYOLEFIN/FILLER PRECURSOR FILMS

BACKGROUND

1. Field of the Invention

The invention relates to breathable polymer films—polymer films which are gas/vapor permeable and liquid impermeable—prepared from highly filled polyolefin film.

2. Related Art

It is known to prepare porous polyolefin films by stretching a precursor film filled with calcium carbonate. "Breathable" films which are gas/vapor permeable and liquid impermeable have been described in U.S. Pat. No. 4,472,328, assigned to Mitsubishi Chemical Industries, Ltd. The Mitsubishi patent describes a breathable polyolefin film prepared from a polyolefin/filler composition having from 20 percent to 80 percent by weight of a filler such as a surface treated calcium carbonate. A liquid or waxy hydrocarbon polymer elastomer such as a hydroxy-terminated liquid polybutadiene was found to produce a precursor film that could be monoaxially or biaxially stretched to make a film breathable. The breathable film described by Mitsubishi is also described in Great Britain Pat. No. 2,115,702, assigned to Kao Corporation. The Kao patent further describes a disposable diaper prepared with a breathable film as disclosed by the Mitsubishi patent. The breathable film is used as a backing for the diaper to contain liquid.

U.S. Pat. No. 4,350,655, assigned to Biax Fiber Film, describes a porous polyolefin film containing at least 50 percent by weight of a coated inorganic filler. The precursor film is formed without the addition of an elastomer by employing an inorganic filler surface coated with a fatty acid ester of only silicon or titanium. The precursor film is then rolled between horizontally grooved rollers. Cold stretching of the precursor film at a temperature below 70° C. produces a porous film. Some of the resulting films were stated to be both vapor and liquid permeable, however, at least one film (Example 3) was stated to be permeable to air.

SUMMARY OF THE INVENTION

The present invention relates to breathable films produced by stretching of a precursor film prepared from a polyolefin/filler composition. It has been discovered that the permeability and strength, especially tear strength, of the breathable films are improved by melt embossing the precursor film with a patterned melt embossing roller and stretching the film to impart a pattern of different film thicknesses having greater permeability within the areas of reduced thickness in comparison to the areas of greater thickness. Cast extrusion of the precursor film onto the embossing roller followed by stretching in the transverse direction is preferred.

DETAILED DESCRIPTION OF PREFERRED EMBODIMENTS OF THE INVENTION

Film Forming Compositions

Breathable films of the present invention are produced from a precursor film that is prepared from a polymer composition that comprises at least a polyolefin component and a filler. The polyolefin component may be any polyolefin which is suitable for film production, such as polypropylene, copolymers of propylene, homopolymers and copolymers of ethylene or blends thereof. A preferred polyolefin is a copolymer of polypropylene and low density polyethylene, particularly preferred is linear low density polyethylene.

Linear low density polyethylene (LLDPE) is produced by copolymerizing ethylene with a $C_4$ to $C_{10}$ alpha-olefin. Generally the preferred alpha-olefins include those selected from the group comprising butene-1, pentene-1, hexene-1, 4 methylpentene-1, heptene-1, and octene. The comonomers are present in amounts up to 20 wt. %, normally between 3 and 14 wt. %. The polymerization is conducted at low pressure using a chromium catalyst or Ziegler catalyst and may be carried out in the gas phase. The LLDPE produced by such methods have a density between 0.900 and 0.935 $g/cm^3$ and a melt index (MI) between 0.1 and 5.0 grams per 10 minutes. Manufacturing processes for production of LLDPE are known, such as disclosed in U.S. Pat. Nos. 4,076,698 and 4,205,021. LLDPE is preferred as the polyolefin component for use in this invention because of its high tear strength, ease of compounding, and low cost.

Fillers useful in this invention may be any inorganic or organic material having a low affinity for and a significantly lower elasticity than the polyolefin component. Preferably the filler should be a rigid material having a non-smooth hydrophobic surface, or a material which is treated to render its surface hydrophobic. The preferred mean average particle size of the filler is between about 3 to 5 microns for films having a thickness of between 4–6 mil prior to stretching. Examples of the inorganic fillers include calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay, etc. Calcium carbonate is particularly preferred for low cost, whiteness, inertness, and availability. The inorganic fillers such as calcium carbonate are preferably surface treated to be hydrophobic so that the filler can repel water to reduce agglomeration of the filler. Also, the surface coating should improve binding of the filler to the polymer while allowing the filler to be pulled away from the polyolefin under stress. A preferred coating is calcium stearate which is FDA approved and readily available. Organic fillers such as wood powder, pulp powder, and other cellulose type powders may be used. Polymer powders such as Teflon ® powder and Kevlar ® powder can also be used.

The amount of filler added to the polyolefin depends on the desired properties of the breathable film including tear strength, water vapor transmission rate, and stretchability. However, it is believed that a breathable film cannot be produced as is taught herein with an amount of filler less than about 15 percent by volume of the polyolefin/filler composition (e.g. LLDPE/$CaCO_3$ having less than about 38 percent by weight $CaCO_3$). The minimum amount of filler is needed to insure the interconnection within the film of voids created at the situs of the filler particularly by the stretching operation to be subsequently performed on the precursor film. Further, it is believed that useful films could not be made with an amount of the filler in excess of about 35 percent by volume of the polyolefin/filler composition (e.g. LLDPE/$CaCO_3$ having greater than about 65 percent by weight $CaCO_3$). Higher amounts of filler may cause difficulty in compounding and significant losses in strength of the final breathable film.

Polyolefin/filler compositions usable in this invention may be compounded in several different ways. The components may be brought into intimate contact by, for example, dry blending these materials and then passing the overall composition through a compounding extruder. Alternatively, the polyolefin and filler components may be fed directly to a mixing device such as a compounding extruder, high shear continuous mixer, two roll mill or an internal mixer such as a Banbury mixer. Overall, the objective is to obtain a uniform dispersion of the filler in the polymer without agglomeration, and this is readily achieved by inducing sufficient shear and heat to cause the polyolefin component to melt. However, time and temperature of mixing should be controlled as is normally done to avoid molecular weight degradation. Compounding of LLDPE and calcium carbonate that is surface treated with calcium stearate has been improved by vacuum drying the mixture within the extruder.

The tear strength and softness of a film prepared from the polyolefin/filler composition may be improved by addition of small amounts of an olefinic elastomer.

Film Extrusion and Melt Embossing

The film forming composition may be manufactured into a precursor film by conventional tubular extrusion (blown bubble process) or by cast extrusion. Film formation by cast extrusion is preferred because the cast film can be immediately melt embossed as described below.

In the cast extrusion process, the molten resin is extruded from an elongate die in the form of a web. The web is pulled over at least one patterned embossing roller to chill and solidify the film with an embossed pattern for reasons discussed further below. The precursor film is preferrably produced to a guage of 4 to 6 mils, which allows for further stretching as described below. The extrusion temperatures, die temperatures, and embossing roll temperatures will depend on the composition employed, but generally will be in the following ranges for compositions of the present invention prepared by cast extrusion:

| | |
|---|---|
| Melt Temperature (°F.) | 350–450 |
| Die Temperature (°F.) | 350–450 |
| Embossing Roll Temperature (°F.) | 70–130 |

Film formation by tubular extrusion produces balanced films having increased film strength in both the machine and cross-machine direction. In the tubular blown film process, the film forming composition is first melted and then extruded through an annular die. The die should preferably have a die gap suitable for extruding LLDPE resin which normally is greater than about 0.5 mm and preferably greater than 0.75 mm. The film forming composition is extruded at a melt temperature between about 150° C. to 300° C., preferably between 190° C. and 240° C. The molten composition is preferably extruded in an upward vertical direction in the form of either a bubble or a tube, although it also can be extruded either downwardly or horizontally. The tubular extrudate is expanded to the desired dimensions and then cooled by one of several conventional techniques which are well known in the art, e.g., forced air, mandrel, and water quench. The tubular film, or bubble, is then flattened by passing the film through a collapsing frame and a set of nip rolls. The nip rolls are driven, thereby proving a means of drawing the tubular film or bubble away from the annular die.

A positive pressure of a gas, such as air or nitrogen, is maintained inside the tubular bubble. As is known in the operation of conventional blown film processes, the presence of the gas is controlled to impart a desired dimensional orientation to the film tube or bubble. The degree of tubular bubble expansion may be measured as the ratio of the expanded bubble circumference to the circumference of the die annulus. This ratio is generally in the range of 1:1 to 6:1 and for a precursor breathable film is preferably from 2:1 to 4:1.

Embossing is typically used on the surface of polyolefin films to reduce gloss. Embossing can be imposed on the precursor film surface at the time of the film fabrication for cast extrusion, or at a subsequent time for cast or tubular extrusion by procedures well known in the art. For the present invention, embossing imposes a pattern of different film thicknesses within the precursor film, and can be conducted with any micro/macro pattern, e.g. cross-hatching, dots, lines, circles, diamonds, hexegons etc. The pattern can be either in line and/or off line and the rolls can be engraved with either pin up and/or pin down type configurations.

Stretching and Heat Setting

Final preparation of a breathable film is achieved by stretching the precursor film to form interconnected voids. Stretching or "Orientation" of the film may be carried out monoaxially in the machine direction (MD) or the transverse direction (TD) or in both directions (biaxially) either simultaneously or sequentially using conventional equipment and processes following cooling of the precursor film.

Blown films are preferably stretched in the machine direction or in both directions whereas cast films are preferably stretched in the transverse direction. For orientation in the MD, the precursor film is passed around two rollers driven at different surface speeds and finally to a take up roller. The second driven roller which is closest to the take up roll is driven faster than the first driven roller. As a consequence the film is stretched between the driven rollers.

Film orientation may also be carried out in a tentering device with or without MD orientation to impart TD orientation to the film. The film is gripped by the edges for processing through the tentering device.

Stretching of melt embossed precursor films with a tentering device at a film speed of about 60 meters per minute produced breathable films having the desired water vapor permeability. The resulting films had greater permeability in the areas of reduced thickness in comparison to the areas of greater thickness.

Although not thoroughly investigated, controlling of the strain on the film during stretching is believed to be important to controlling the permeability. For stretching in the transverse direction, strain is controlled for a given stretch ratio by adjusting the film speed and the stretching distance. The stretching distance is measured, between the point where the film starts to increase in width to the closest point where the film is fully stretched. For stretching in the machine direction, strain is controlled for a given stretch ratio by controlling film speed and the gap between the first and second driven rollers.

A range of stretching ratios from 1:2 to 1:5 prove satisfactory for MD stretching with a ratio of 1:4 being preferred. A range of stretching ratios of 1:2 to 1:5 prove satisfactory for TD stretching with a ratio of 1:4 being preferred.

The water vapor permeability of the embossed film following stretching, as measured by the final WVTR of the film, was found to be inversely related to the stretching temperature. Stretching at a temperature of about 45° C. produced a film having a slightly higher WVTR than stretching at temperatures of about 60° C.

The stretched film can be heat set to stabilize the film for any subsequent processing at temperatures above the stretching temperature. The film can be heat set at any temperature above the stretching temperature and below the softening temperature to add stability. However, higher temperatures cause stiffness and some reduction in WVTR. Heat setting at about 80° C. produced a softer film with substantially higher WVTR in comparison to heat setting at about 95° C.

It is preferred that tension be maintained on the film during the heat setting and cooling to minimize shrinkback. Upon cooling to ambient temperature (i.e., room temperature) or near ambient, the holding force may be released. The film may contract somewhat (snapback) in the TD but will retain a substantial portion of its stretched dimension.

Heat setting can be accomplished by maintaining the film under tension in the stretched condition at the heat setting temperature for about 1-2 minutes. Preferably, however, the heat setting and cooling is carried out while permitting the film to contract slightly, but still under stress. The controlled shrinkback of from 5 to 30%, preferably between 15 and 25%, of the maximum stretched width has given particularly good results in eliminating storage shrinkage.

EXAMPLES

The following examples, which illustrate melt embossed breathable films prepared in accordance with the present invention, are not intended to limit the invention to the specific compositions. Other compounds such as elastomers, stabilizers against heat or ultraviolet rays, pigments, antistatic agents, etc. may be added to the compositions in the conventional manner. Variations in composition and manufacturing techniques will be readily apparent to persons skilled in the art of manufacturing polyolefin films and are within the scope of this invention. In the examples which follow water vapor transmission rates (WVTR) were measured in accordance with ASTM F372-73 using a Permatran W1 analyzer manufactured by Modern Controls International Inc.

EXAMPLE 1 (COMPARISON)

A linear low density polyethylene which consisted of a copolymer of ethylene and hexene-1 was compounded with an equal weight of a surface treated calcium carbonate. The calcium carbonate was surface treated with calcium stearate to render the surface of the particles hydrophobic. The resulting formulation was cast extruded into a precursor film having a thickness of approximately 4 to 6 mil.

The resulting precursor film was cooled and then subjected to tentering stress in the transverse direction with a stretch ratio of 4 to 1 and a film speed of about 60 meters per minute. Stretching was performed in a tentering frame with heat applied only to the final zone of the tentering frame. The temperature of the film in the final zone was maintained at about 93° C. As a result of convection within the tentering frame, stretching of the film occurred at approximately 60° C. The film became white and breathable when stretched and retained those properties following the heat setting treatment. The final breathable film had a water vapor transmission rate of up to 5800 grams per square meter per day at 38° C.

EXAMPLE 2

The LLDPE/calcium carbonate composition of Example 1 was cast extruded under the same conditions as Example 1. The precursor film was passed between a smooth roller and a diamond patterned embossing roller. The resulting film had a thickness of approximately 4 to 6 mil and a diamond pattern on one side. The film became whiter when stretched at the temperature and conditions stated for Example 1. Heat setting was also conducted as described for Example 1. This film had a WTVR value of 8,100 grams per square meter per day. Stretching caused greater permeability in the thin portions of the film created by the embossing roll in comparison to the thick area which retained greater strangth. The final film had a drapy and softer film structure and a higher tear strength than the film of Example 1.

EXAMPLE 3

The LLDPE/filler composition of Example 1 was extruded and melt embossed under the same conditions of Example 2. The precursor film was then stretched with the tentering device of Example 2. The temperature of the film in the heat setting zone was maintained at about 78° C. and stretching occurred at about 35° C. The final film had a WTVR value of 10,300 grams per square meter per day.

EXAMPLE 4

A breathable film was prepared under the same conditions of Example 3 except that the stretching temperature was adjusted to 70° C. The final film had a WVTR value of 10,000 grams per square meter per day.

EXAMPLE 5

A breathable film was prepared under the same conditions of Example 3 except that the stretching temperature was adjusted to 93° C. The final film had a WVTR value of 9,900 grams per square meter per day.

The following table presents a comparison of the variables in Examples 1-5.

|  | Stretch Temp., °C. | Heat Set Temp., °C. | WVTR g/m²/day |
| --- | --- | --- | --- |
| Example 1 (Comparison) | 60 | 93 | 5,800 |
| Example 2 | 60 | 93 | 8,100 |
| Example 3 | 35 | 78 | 10,300 |
| Example 4 | 70 | 78 | 10,000 |
| Example 5 | 93 | 78 | 9,900 |

USES

The breathable films of the present invention can replace currently available breathable films in such applications as diaper back sheets and light weight camping and backpacking equipment. Breathable films are expected to have a wide variety of applications in the fields of medical and surgical supplies, apparel and household furnishings, tape and packaging, and filtration membranes. For example, breathable films can be used to replace porous films in applications such as burn dressings, sterile packaging, rain coats, shoe linings, nonfogging packaging film, bacteria filters, water purification filters, and wind insulation of houses and buildings.

What is claimed is:

1. A method of making a breathable film comprising the steps of:
   mixing a polyolefin with a filler;
   extruding a precursor film from the polyolefin/filler mixture;
   melt embossing the precursor film to impose therein a pattern of different film thicknesses; and
   stretching the melt embossed precursor film to impart greater permeability in the areas of reduced thickness thereof in comparison to the areas of greater thickness.

2. The method of claim 1, further comprising the step of heat setting the stretched film at a temperature above the stretching temperature and below the softening temperature of the stretched film.

3. The method of claim 1, wherein the polyolefin is a copolymer of ethylene and a $C_4$–$C_{10}$ alpha-olefin.

4. The method of claim 1, wherein the filler is calcium carbonate surface treated with calcium stearate.

5. The method of claim 1, wherein the precursor film is melt embossed with a diamond pattern.

6. The method of claim 1, wherein the polyolefin/filler mixture contains between about 15 percent to about 35 percent filler by volume.

7. A breathable film produced by a process comprising the steps of:
   mixing a polyolefin with a filler;
   extruding a precursor film from the polyolefin/filler mixture;
   melt embossing the precursor film to impose therein a pattern of different film thicknesses; and
   stretching the melt embossed precursor film to impart greater permeability in the areas of reduced thickness thereof in comparison to the areas of greater thickness.

8. The breathable film of claim 7, further produced by the step of heat setting the stretched film at a temperature above the stretching temperature and below the softening temperature of the stretched film.

9. The breathable film of claim 7, wherein the polyolefin is a copolymer of ethylene and a $C_4$–$C_{10}$ alpha-olefin.

10. The breathable film of claim 7, wherein the filler is calcium carbonate surface treated with calcium stearate.

11. The breathable film of claim 7, wherein the precursor film is melt embossed with a diamond pattern.

12. The breathable film of claim 7, wherein the polyolefin/filler mixture contains between about 15 percent to about 35 percent filler by volume.

13. A breathable film, comprising:
    a polyolefin and a filler; and
    a pattern of different film thicknesses having greater permeability in the areas of reduced thickness thereof in comparison to the areas of greater thickness.

14. The breathable film of claim 13, wherein the polyolefin is a copolymer of ethylene and a $C_4$–$C_{10}$ alpha-olefin.

15. The breathable film of claim 13, wherein the filler is calcium carbonate surface treated with calcium stearate.

16. The breathable film of claim 13, wherein the pattern of different film thicknesses is a diamond pattern.

17. The breathable film of claim 13, wherein the filler is present in an amount between about 15 percent to about 35 percent by volume of the total amount of the polyolefin and the filler.

18. A method of making a breathable film comprising the steps of:
    mixing a polyolefin with a filler;
    cast extruding a precursor film of the polyolefin/filler mixture onto at least one melt embossing roller to impose therein a pattern of different film thicknesses; and
    stretching the melt embossed precursor film in the transverse direction to impart greater permeability in the areas of reduced thickness thereof in comparison to the areas of greater thickness.

19. The method of claim 18, further comprising the step of heat setting the stretched film at a temperature above the stretching temperature and below the softening temperature of the stretched film.

20. The method of claim 18, wherein the polyolefin is a copolymer of ethylene and a $C_4$–$C_{10}$ alpha-olefin.

21. The method of claim 18, wherein the filler is calcium carbonate surface treated with calcium stearate.

22. The method of claim 18, wherein the precursor film is melt embossed with a diamond pattern.

23. The method of claim 18, wherein the polyolefin/filler mixture contains between about 15 percent to about 35 percent filler by volume.

24. A breathable film produced by a process comprising the steps of:
    mixing a polyolefin with a filler;
    cast extruding a precursor film of the polyolefin/filler mixture onto at least one melt embossing roller to impose therein a pattern of different film thicknesses; and
    stretching the melt embossed precursor film in the transverse direction to impart greater permeability in the areas of reduced thickness thereof in comparison to the areas of greater thickness.

25. The breathable film of claim 24, further produced by the step of heat setting the stretched film at a temperature above the stretching temperature and below the softening temperature of the stretched film.

26. The breathable film of claim 24, wherein the polyolefin is a copolymer of ethylene and a $C_4$–$C_{10}$ alpha-olefin.

27. The breathable film of claim 24, wherein the filler is calcium carbonate surface treated with calcium stearate.

28. The breathable film of claim 24, wherein the precursor film is melt embossed with a diamond pattern.

29. The breathable film of claim 24, wherein the polyolefin/filler mixture contains between about 15 percent to about 35 percent filler by volume.

* * * * *